Sept. 14, 1926.
M. V. KERLEY
1,599,534
METHOD OF PRODUCING RETREADING MATRICES
Filed April 7, 1926
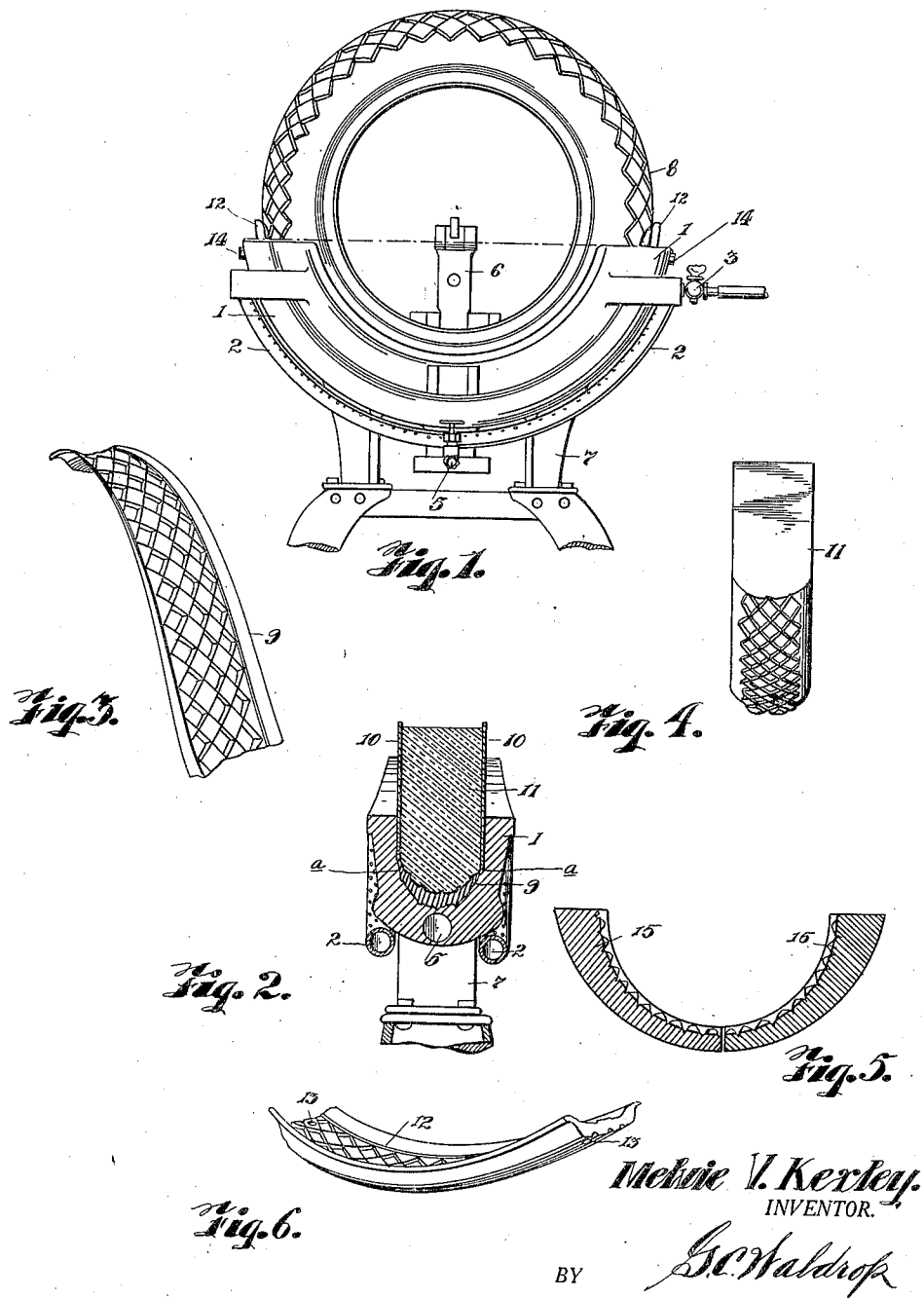

Patented Sept. 14, 1926.

1,599,534

UNITED STATES PATENT OFFICE.

MELVIE V. KERLEY, OF DALLAS, TEXAS.

METHOD OF PRODUCING RETREADING MATRICES.

Application filed April 7, 1926. Serial No. 100,263.

This invention relates to a new and improved method of producing matrices for retreading pneumatic tires and the invention has for its primary object to provide a rapid and economical means for the production of master patterns, as well as matrices to re-establish treads of any desired design, which will enable the matrices so produced to be readily interchangeable and used to equip old and obsolete sectional tire molds with modern patterns, thus enabling the owner of such molds to maintain modern and prevalent designs in the retreading of tires.
The invention further aims among its objects to provide for the retreading of the well known balloon type of pneumatic tire, by increasing the thickness of the matrices at one end of each section, thereby to conform with the diameter of the tire upon which a new tread is desired.

Another important object of the invention resides in the fact that a new and unused automobile tire may be employed in producing duplicate design impressions to form the initial pattern without injury whatsoever to the tire.

With these primary objects in view, the invention consists further of lesser objects and advantages, as well as certain novel features and advantages residing in the improved application of elements in the carrying out of the method and manifested in the following detail description, taken in connection with the accompanying drawings, wherein:

Figure 1 represents a tire mold and the manner of reproducing a tread impression in the initial or rubber matrix, prior to the production of a master pattern.
Fig. 2 represents a vertical cross-section of the mold, laterally taken, illustrating the manner by which a further reproduction of design is obtained from the rubber matrix to produce a pattern from which the permanent metal matrix or master pattern is produced.

Figure 3 represents a fragmentary view of the rubber matrix.

Figure 4 is an end view of the secondary matrix or pattern.

Figure 5 is a sectional view of the sectional metal matrices or master pattern as produced for the retreading of balloon tires or tires of lesser diameters, and Figure 6 is a detail view of a completed master pattern section.

It may be stated in continuing further with the invention, that it is a well known and established precedent to employ matrices of both metal and other materials for the reproduction of designs in retreading pneumatic tires, and no novelty resides in the product of the present invention aside from the perfect reproduction of design and permanency of such designs of which the invention is capable of attaining, the novelty residing only in the improved manner by which the matrices are produced.

Now, in proceeding further, attention is directed to Figure 1 of the drawings, in which the character 1 denotes a sectional metal tire mold of any suitable construction which is equipped with an auxiliary heating arrangement consisting preferably of gas burners 2, curved to conform as shown with the semi-circular body of the mold and to which reference will again hereinafter be made. These burners are provided with a suitable gas connection 3. In addition to this heating arrangement, a steam chamber 4 is provided in the mold, having a connection 5.

Suitable clamping means 6 for the tire is further provided on the mold, however this element may be altered in any manner to suit the occasion. The mold is mounted upon a base 7.

The first operation in carrying out the herein-described method is to place in the channel of the mold a sheet of raw rubber or its equivalent of proper width, length and thickness, after which, a pneumatic automobile tire 8, of a size to fit the mold is placed upon the rubber sheet, and sand or air bag of the usual construction is placed within the tire, after which the latter is clamped securely in place by the clamps 6. Steam pressure is then applied to the extent of approximately forty or fifty pounds and through the heat thereof the rubber sheet attains a semi-plastic state to readily receive the impressions of the design on the surface of the tire. The completed matrix thereby produced is shown in Figure 3, and referred to by the character 9, however, as previously stated, is not claimed herein as novel.

Now, in converting this matrix into one of metal, or a master pattern is the novel feature claimed in the invention, therefore, with this in view the rubber matrix is removed from the mold, the edges trimmed, and the defects, if any, cured then replaced in the mold. Preparatory to producing a secondary matrix from the rubber matrix 9, a pair of side walls 10, are cut from sheet metal, and rounded on their bottoms to conform with the circular shape of the mold, and the height to accord with that of the mold. The lower edges of these metal sheets extend downwardly into the mold to within one-half inch of the edges of the rubber matrix 9, reposing therein. This one-half inch of space is suitably covered with tissue paper or other thin material and cemented to the sides of the metal walls as at a to retain it in place. A trough is thereby produced in which form the secondary pattern or matrix. This latter matrix is prepared initially in a plastic state from a mixture of water and plaster of Paris, or of molder's sand, litharge and linseed oil. As to the ingredients of this mixture no novelty is claimed.

The described mixture is poured between the side walls 10, as in Figure 2, the tissue paper at a preventing the mixture from coming in contact with the walls of the mold and preventing any difficulty in removing the form 11, also the paper allows the form to close the space along the edge of the rubber matrix, thus rendering possible a perfect casting of a metal matrix when the rubber matrix 9 is removed.

Now, having completed the secondary matrix or cope, the latter is permitted to attain a mechanical set, after which it is removed from the mold, and the rubber matrix taken out. The matrix or cope 11 is replaced in the mold and securely clamped to the latter to avoid possible displacement, after which molten metal preferably aluminum alloys, or its equivalent is poured into the space intermediate the mold and form, thus reproducing a perfect duplicate of the rubber matrix in the metal and a master pattern 12, as in Figure 6, is the product from which design reproductions may be made as desired.

As a means for holding the matrix 12 against movement in the mold in retreading a tire, a small hole 13 is drilled in either end thereof and in the mold ends to aline therewith and a short bolt 14 is extended through these holes, as in Figure 1.

A further advantage of the present invention lies in the fact that the tread design of any tire may be altered in various ways, by vulcanizing rubber into, or filling any part of the figures or indentations on the tread of such tire, thus changing the design prior to the initial reproduction thereof in the rubber matrix. Also, all of the indentations of the tread design may be filled and the tire tread made smooth, after which any desirable tread design may be carved in the rubber thus materially simplifying the designing of a new style tread.

It is obvious from the foregoing, that the method is built up to finally produce a matrix which will withstand the intense heat of molten metal in the production of the master pattern, and at no time, as in some methods, is the tire, from which the initial design is obtained, subjected to the intense heat of the metal while in a molten state, as the rubber will not endure such heat, and is wholly inefficient as an initial pattern in the absence of a secondary or positive cope or matrix formed as described.

In Figure 5, will be seen a modified example of the master pattern, whereby is made possible the retreading of balloon tires, or tires having smaller and varied diameters, and which consists of sectional matrices 15, produced accordingly to the foregoing method, but in so producing the initial or rubber matrix 9 is built up at one end in order to conform with the circumference of the tire from which the design is to be taken, then the tire is placed in the mold and the described process carried out to finally produce the master pattern 15, which, as obvious from the Figure 5, has upper ends of greater thickness than the lower end.

Referring again to the heating arrangement 2, it has been found to expedite the forming of the metal matrix, to first heat the mold 1, to a reasonable degree before pouring the metal to insure against premature cooling which may result in an inferior reproduction of the design.

It should be understood that while all of the operations described as forming the subject matter of the proposed method are included in the annexed claims therefor, certain modifications may be resorted to, such as substituting other materials for those described, without affecting the spirit or intent of the invention or departing from the scope of the said claims.

I claim:

1. The hereindescribed method of producing a master pattern tire retreading matrix which consists initially in placing a sheet of raw rubber in a tire mold; then in placing on said rubber sheet, a tire having the desired tread design; then in subjecting said mold to a predetermined steam pressure to reproduce said tread design in said rubber to produce a matrix; then in removing said tire and forming side walls for said mold; then in filling the trough thereby formed with a composition of plaster of Paris to produce a secondary matrix; then in replacing said secondary matrix in said mold and securing the same; then in heating said mold to a predetermined temperature, and finally in pouring molten aluminum alloy in the space between said secondary matrix and mold to produce a master pattern.

2. The hereindescribed method of producing a master pattern for retreading tires which consists initially in producing a rubber matrix, by placing a sheet of raw rubber in a tire mold and clamping a tire having the desired tread design, on said rubber sheet; then in subjecting said rubber sheet to a predetermined steam pressure to obtain a semi-plastic condition thereof; then in removing said tire and rubber matrix from the mold; then in trimming and curing the defects in said rubber matrix and returning the same to the mold; then in stationing walls on opposing sides of said mold; then in pouring a self hardening plastic mixture between said walls to obtain a positive impression from said rubber matrices to produce a secondary matrix; then in removing said latter matrix and rubber matrix, and in replacing said secondary matrix; and finally in pouring molten metal in the space intermediate said secondary matrix and mold to produce a master pattern.

3. The hereindescribed method of producing a master pattern for retreading tires, which consists initially in obtaining a design impression of a tire by placing a sheet of raw rubber in a mold and clamping the tire thereon, then in subjecting the same to a predetermined pressure, then in removing said tire and rubber matrix thereby formed and curing the defects in the latter and replacing the same in the mold; then in applying side walls to the mold; then in filling in between said side walls with a self hardening plastic composition to obtain a secondary positive impression from said rubber matrix to produce a pattern, then in removing said pattern and rubber matrix and in replacing said pattern, and finally in pouring molten metal in the space between said pattern and mold to produce a master pattern.

4. The hereindescribed method of reproducing a tire tread design for the production of a master retread matrix, which consists initially in placing a sheet of raw rubber in a mold and clamping a tire thereon having the desired tread design; then in subjecting said rubber sheet to a predetermined steam pressure; then in removing said tire and rubber matrix thereby formed and curing defects in the latter and replacing the same, then in filling said mold with a self hardening plastic composition to obtain a positive reprint of the design in said rubber matrix to produce a secondary pattern; then in removing said secondary pattern and rubber matrix and in replacing said secondary pattern, and finally in filling the space between said secondary pattern and mold with molten metal to produce a master matrix.

5. The hereindescribed method of reproducing a tire tread design in initial matrices for the production of a master pattern which consists initially of obtaining an imprint of a design in a sheet of raw rubber from an unused tire by subjecting the same to steam pressure thereon in a mold; then in removing said tire and rubber matrix thereby formed from the mold and curing the defects in the latter and replacing the same in the mold; then in pouring a self hardening, plastic composition into said mold to obtain a secondary pattern from said rubber matrix; then in removing said matrices thereby formed and replacing said secondary matrix in the mold and finally in filling the space between the mold and secondary matrix with molten metal to produce a master pattern.

In testimony whereof I affix my signature.

MELVIE V. KERLEY.